May 18, 1937. E. G. BOYER 2,080,906
PIPE ALIGNING TOOL
Filed Feb. 28, 1935
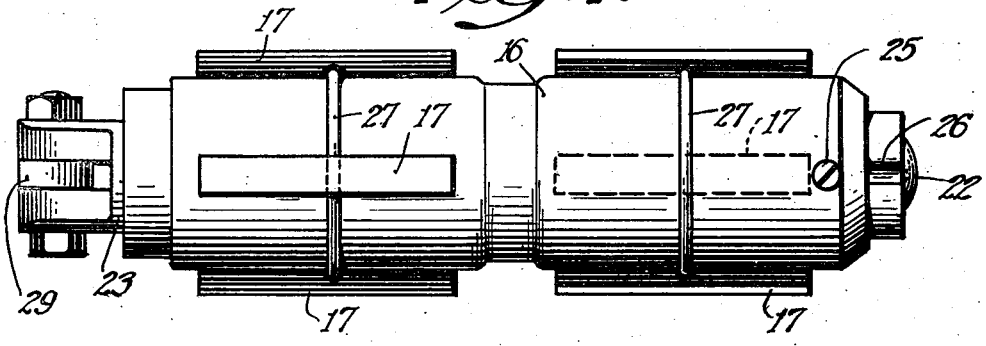
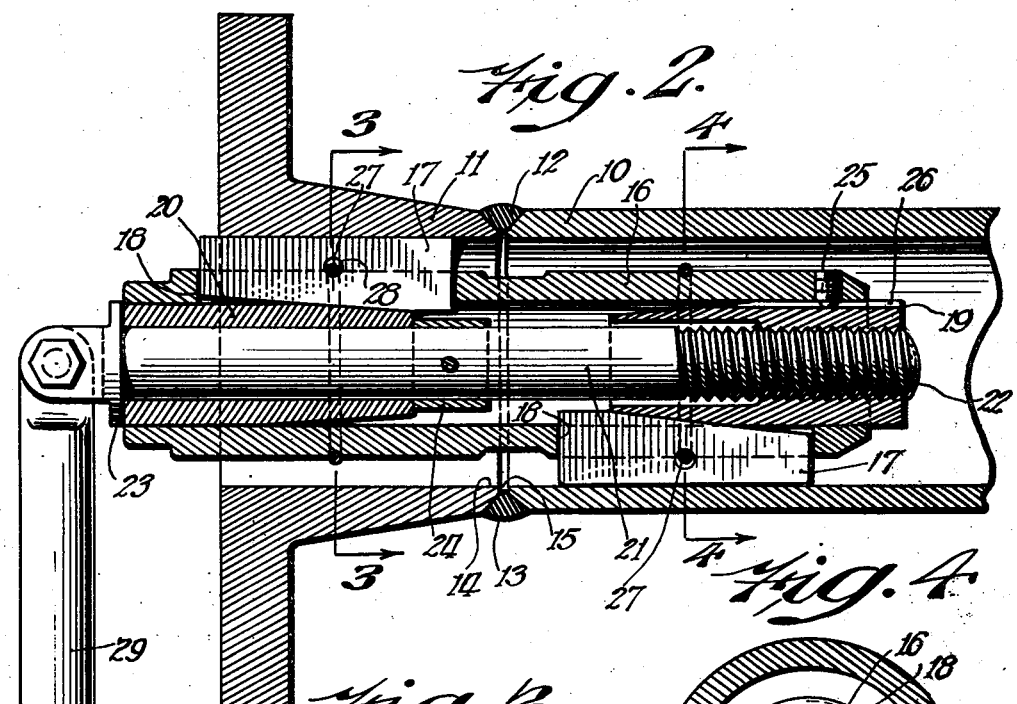
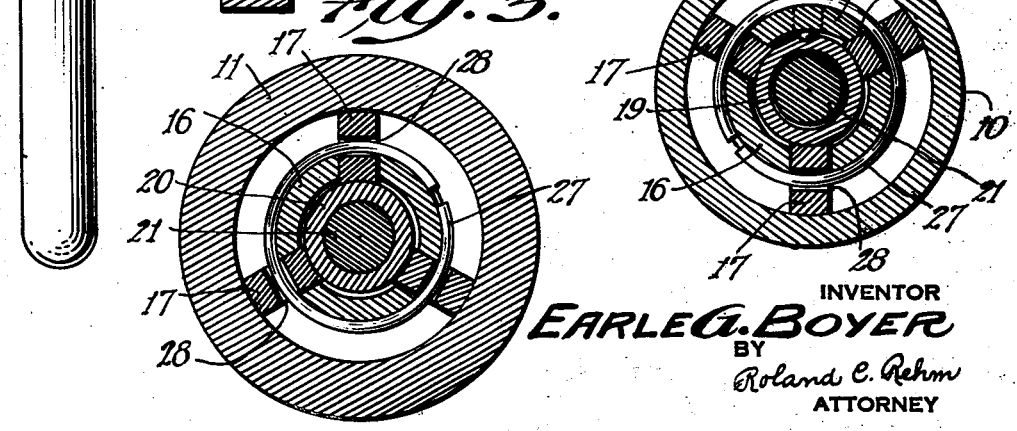
INVENTOR
*Earle G. Boyer*
BY
*Roland C. Rehm*
ATTORNEY Patented May 18, 1937

2,080,906

UNITED STATES PATENT OFFICE 2,080,906

PIPE ALIGNING TOOL

Earle G. Boyer, Philadelphia, Pa., assignor to Hannifin Manufacturing Co., Chicago, Ill., a corporation of Illinois Application February 28, 1935, Serial No. 8,707

7 Claims. (Cl. 113—102)

This invention relates to pipe welding and among other objects aims to provide means for properly aligning and positioning sections of pipe or the like during the welding process without involving objectionable consequences.

The nature of the invention may be readily understood by reference to one construction embodying the invention shown in the accompanying drawing.

Fig. 1 is a plan view of an aligning and holding tool;

Fig. 2 is a longitudinal section through a pipe and flange section held in welding relationship by the aforesaid tool; and Figs. 3 and 4 are similar sections taken respectively on planes 3—3 and 4—4 of Fig. 2.

The invention is illustrated in connection with the welding of one section of pipe to a flange section but obviously the invention applies equally to the welding of a section of pipe to any other fitting or to another section, or for welding two fittings together. For the sake of simplicity, the pieces to be welded together will simply be referred to as "sections".

The sections 10 and 11 should not only be held in alignment, but should be properly spaced to avoid burning metal on the interior section in such a way as to cause an inwardly projecting fin or seam. The space 12 by which the two sections are separated may of course vary with the particular pieces joined. The spacing shown herein is therefore simply illustrative. Also the particular manner of treating the edges to be welded may vary. In the present instance the adjoining edges are beveled as at 13 but the bevel preferably does not extend to the inner face 14 of the sections so as to leave a blunt edge 15 instead of a thin edge which might readily be burned.

The illustrative holding tool is adapted not only to align the sections to be welded and to hold them in properly spaced relation, but to function effectively regardless of small variations either in internal diameter or in irregularity in internal section. The tool is adapted to engage the sections at points remote from the locality of the weld so as neither to affect the weld nor to be damaged by the welding process. In the present instance the tool may be adjusted to a large variety of internal diameters.

As here shown, the tool comprises a cylindrical tube or barrel 16 of an external diameter small enough to enter the smallest size sections with which the tool is intended to be employed. The barrel carries two sets of pipe gripping means which are spaced longitudinally so as to grip the respective sections a substantial distance on opposite sides of the locality of the weld. Each set is here shown as comprising a plurality of radially movable jaws 17 (three in this case) which are shown slidably seated in radial slots 18 in the barrel 16. Actuating means for each of the sets of jaws comprise longitudinally slidable devices, provided with oppositely tapered conical wedging surfaces 19 and 20, adapted to be moved longitudinally of the barrel in opposite directions to affect a movement of the respective sets of jaws. The wedges, while freely slidable in the barrel, fit it closely so as to prevent any lateral displacement of a set of jaws relative to the barrel. As here shown, the wedges are mounted upon a screw shaft 21 extending longitudinally of the barrel which, in this case, is threaded at one end 22 into one of the wedges. The other wedge is held on the shaft between the collar 23, in this case integral with the shaft, and the collar 24 pinned to the shaft. Rotation of the screw shaft relative to the wedges separates or draws them together, depending upon the direction of rotation. Preferably the threaded wedge is held against rotation with the screw so as to insure the aforesaid movement. In the present instance this is effected by a key screw 25 carried by the barrel and projecting into a longitudinal groove 26 in the wedge. It will be understood that the key is not set up so tightly as to prevent longitudinal movement of the wedge.

In the present instance the jaws 17 are held in operative engagement with their respective wedges by split spring rings 27 which pass through holes 28 in the jaws and draw them together against their respective wedges. The rings when in normal position are shown seated in circumferential grooves in the barrel.

Preferably the sets of jaws are angularly offset relatively to each other so as not to be in alignment and, as shown in Figs. 3 and 4, the offset is such as to provide a symmetrical arrangement of the jaws. This provides a more effective and better distributed gripping of the sections to be welded and is particularly efficient in holding the sections against warping or distortion after the completion of the weld. It will be understood that for heavy pieces, particularly when welded together by the oxyacetylene torch, the heat may spread so extensively as to make distortion or warping unavoidable unless the sections be held in place until the danger of warping is past. It will be understood that each of the sets of jaws operates independently and is adapted to grip the pipe notwithstanding slight differences in diameter or irregularities in internal section. No part of the tool is in contact with the sections at or closely adjacent the locality of the weld and cannot therefore be damaged during the welding process.

To adapt the tool to varying sizes of pipe, it is simply necessary to employ sets of jaws 17 of the proper depth. The jaws may be readily removed by springing the rings 27 outwardly to permit the former to clear the barrel.

A pivoted handle 29 is advantageously provided for operating the screw 21.

Obviously the invention is not limited to the details of the illustrative construction since these may be variously modified. Moreover, it is not indispensable that all features of the invention be used conjointly since various features may be used to advantage in different combinations and subcombinations.

Having described my invention, I claim:

1. Apparatus for holding sections of pipe in welding relationship comprising in combination a rigid tube smaller in diameter than the internal diameter of the pipe sections and having spaced sets of longitudinal slots, spaced sets of gripping jaws in said slots, jaw actuating wedges in said tube for moving said sets of jaws outwardly to grip the respective pipe sections and to hold the same in rigid relation to each other, means for holding said sets of jaws in operative relation to said wedges, and a screw for moving said wedges relative to said jaws to actuate the latter.

2. Apparatus for holding sections of pipe in welding relationship comprising in combination a tube smaller than the internal diameter of the pipe to be welded and longitudinally slotted to receive spaced sets of gripping jaws in said slot adapted to grip the respective pipe sections on opposite sides of the welding point and sufficiently removed therefrom to be protected from the welding heat, conical jaw actuating wedges inside said tube for simultaneously moving the jaws in each set, means for removably holding said sets of jaws in operative relation to said wedges, and a screw for drawing said wedges together and separating the same to actuate said jaws.

3. Apparatus for holding sections of pipe in welding relationship comprising in combination a tube adapted to extend into each of the pipe sections to be welded together having spaced sets of longitudinal slots, pipe gripping jaws radially slidable in said slots to grip and hold said pipe sections in rigid relation during welding, one set of slots being angularly displaced relative to the other set so that the jaws of one set are out of alignment with the jaws of the other set thereby to minimize warping or cooling of the weld, devices longitudinally slidable in said tube and having wedging surfaces adapted to engage said jaws to move the same outwardly, said devices closely fitting said tube so as to prevent lateral displacement of one set of jaws and the section held thereby relative to the other, and a screw passing through said devices for moving the same relative to said tube to actuate said jaws.

4. Apparatus for holding sections of pipe in welding relationship comprising in combination a tube adapted to extend into each of the pipe sections to be welded together having spaced sets of longitudinal slots, pipe gripping jaws radially slidable in said slots to grip and hold said pipe sections, devices longitudinally slidable in said tube and having wedging surfaces adapted to engage said jaws to move the same outwardly, said jaws closely fitting said slots and said devices closely fitting said tube so as to prevent lateral displacement of one set of jaws relative to the other whereby adjacent pipe sections may be held rigidly independent of each other with proper welding spacing, and a screw passing through said devices for moving the same relative to said tube to actuate said jaws.

5. Apparatus for holding a pair of pipe sections in welding relationship comprising in combination a tube substantially smaller in diameter than the pipe to be welded and having spaced sets of longitudinal slots, pipe gripping jaws radially slidable in said slots, one set of slots being angularly displaced relative to the other set so that the jaws of one set are out of alignment with the jaws of the other set, tubular devices longitudinally slidable in said tube and having wedging surfaces adapted to engage said jaws to move the same outwardly, a split spring ring passing through each of said sets of jaws to press the same inwardly and removable to permit a change in the jaws, said devices closely fitting said tube so as to prevent lateral displacement of one set of jaws relative to the other, and a screw passing through said devices for moving the same relative to said tube to actuate said jaws.

6. Apparatus for holding sections of pipe in welding relationship comprising in combination a tube having spaced sets of longitudinal slots, removable pipe gripping jaws radially slidable in said slots, devices slidable in said tube and having wedging surfaces engaging said jaws to move the same outwardly, a split spring ring passing through said jaws to press the same against said device and removable to permit change of jaws, and means for moving said device relatively to said jaws to wedge the same outwardly.

7. A tool for holding sections of pipe or the like in welding alignment comprising in combination a holder smaller in size than and adapted to extend longitudinally through the pipe sections adjacent their point of juncture, two separate sets of gripping jaws carried by said holder and adapted respectively to grip adjoining sections of pipe or the like and hold the same in alignment, said sets of jaws being spaced apart so as to grip said sections a substantial distance from the juncture between said sections so as to be protected from the welding heat, and means for simultaneously actuating said sets of jaws to grip said sections respectively, said means being constructed and arranged to hold each set of jaws against shifting relative to said holder thereby maintaining the alignment of said sections.

EARLE G. BOYER.